United States Patent
Matsushima et al.

(10) Patent No.: US 7,800,767 B2
(45) Date of Patent: Sep. 21, 2010

(54) PRINTING METHOD AND PRINTING DEVICE

(75) Inventors: Noriyuki Matsushima, Edogawa-ku (JP); Shuichiro Kaneko, Yokohama (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1085 days.

(21) Appl. No.: 11/237,892

(22) Filed: Sep. 29, 2005

(65) Prior Publication Data

US 2006/0285148 A1 Dec. 21, 2006

(30) Foreign Application Priority Data

Jun. 15, 2005 (JP) ............... 2005-175696

(51) Int. Cl.
*G06F 3/12* (2006.01)
*G06K 15/00* (2006.01)

(52) U.S. Cl. ............... 358/1.1; 358/1.15; 358/1.16

(58) Field of Classification Search ............ 358/1.1, 358/1.9, 1.11, 1.12, 1.13, 1.14, 1.15, 1.16, 358/1.17, 1.18, 404, 434, 444
See application file for complete search history.

(56) References Cited

U.S. PATENT DOCUMENTS

| | | | | |
|---|---|---|---|---|
| 6,160,629 A | * | 12/2000 | Tang et al. | 358/1.1 |
| RE37,031 E | * | 1/2001 | Nishiwaki | 358/1.14 |
| 6,181,440 B1 | * | 1/2001 | Masuda | 358/434 |
| 7,253,920 B2 | * | 8/2007 | Hosoda | 358/1.9 |
| 2007/0188773 A1 | | 8/2007 | Matsushima et al. | |

FOREIGN PATENT DOCUMENTS

| | | |
|---|---|---|
| JP | 8-314659 | 11/1996 |
| JP | 2004-094816 | 3/2004 |

* cited by examiner

*Primary Examiner*—Thierry L Pham
(74) *Attorney, Agent, or Firm*—Buchanan Ingersoll & Rooney PC

(57) ABSTRACT

A printing device receives print data for confidential printing, and decides the output destination of the print data received for confidential printing either to be a lockable output bin that can be opened by a key so that the print data can be outputted in a format of being printed on paper, or a digital output bin that is capable of holding the print data and allowing the print data held there to be taken out for printing based on user verification.

18 Claims, 10 Drawing Sheets

FIG.11

| Paper size and orientation | Estimated printing time per page for each printing mode (sec) | | | |
|---|---|---|---|---|
| | Color single side | Monochro single side | Color double side | Monochro double side |
| A6LEF | 0.4 | 0.2 | 0.9 | 0.5 |
| A5LEF | 0.6 | 0.3 | 1.3 | 0.7 |
| A4LEF | 1.0 | 0.5 | 2.1 | 1.1 |
| A6SEF | 0.5 | 0.3 | 1.1 | 0.6 |
| A5SEF | 0.9 | 0.5 | 2.0 | 1.0 |
| A4SEF | 1.4 | 0.7 | 3.0 | 1.5 |
| A3SEF | 2.0 | 1.0 | 4.2 | 2.1 |
| B5 | 0.7 | 0.4 | 1.5 | 0.8 |
| B4 | 1.2 | 0.6 | 2.5 | 1.2 |

PRINTING METHOD AND PRINTING DEVICE

This application is based on Japanese Patent Application No. 2005-175696 filed on Jun. 15, 2005, the contents of which are hereby incorporated by reference.

BACKGROUND OF THE INVENTION

1. Field of the Invention

The invention relates to a printing method and a printing device, in particular, to a printing method and a printing device for confidential printing.

2. Description of the Related Art

When using a printer in an office, it is important to pay attention to prevention of information leakages. Therefore, a printing device such as an MFP (Multi-Function Peripheral), which is commonly used by a plurality of users, normally is equipped with a confidential printing function for preventing a third party from viewing printed matter.

As to the confidential printing function, a method is known for starting to print when the user identification process is completed by the user's operation of the MFP after the print data is transmitted to the MFP (Unexamined Publication Nos. JP-A-8-314659 and JP-A-2004-94816).

However, if the number of pages to be printed or the printing paper size is large or a printing mode such as color printing or double side printing is set up, it may take a long time for printing after the user identification process is completed. In such a case the user ends up spending a lot of time waiting for the completion of printing in front of the MFP in any case. On the other hand, if users hate to spend long times waiting in front of the printer and opt to use conventional printing instead, the rate of confidential printing usage drops and the information leakage prevention will not be as thorough as it is planned to be.

OBJECTS AND SUMMARY

It is an object of the present invention to provide a printing method and a printing device, which are improved for solving the abovementioned problems.

It is another object of the present invention to provide a printing method and a printing device for enabling the user not to wait a long time in front of the printing device contrary to the user's will, while preventing information leakage due to printed matter at the same time.

According to an embodiment of the invention, there is provided a printing method comprising the steps of: 1) receiving print data for confidential printing; and 2) deciding the received said print data's output destination either to be a lockable output bin that can be opened by a key so that the print data can be outputted in a format of being printed on paper, or a holding unit that is capable of holding the print data and allowing the print data held there to be taken out for printing based on user verification.

According to another embodiment of the invention, there is provided a printing device, comprising: a receiving unit for receiving print data for confidential printing; and a controller for deciding the received said print data's output destination either to be a lockable output bin that can be opened by a key so that the print data can be outputted in a format of being printed on paper, or a holding unit that is capable of holding the print data and allowing the print data held there to be taken out for printing based on user verification.

The objects, characteristics and properties of this invention other than those set forth above will become apparent from the description given herein below with reference to preferred embodiments illustrated in the accompanying drawings.

BRIEF DESCRIPTION OF THE DRAWINGS

FIG. 11 is an example of estimated printing time per page in each printing mode.

DETAILED DESCRIPTION OF PREFERRED EMBODIMENTS

The embodiment of this invention will be described below with reference to the accompanying drawings.

Figure 1:
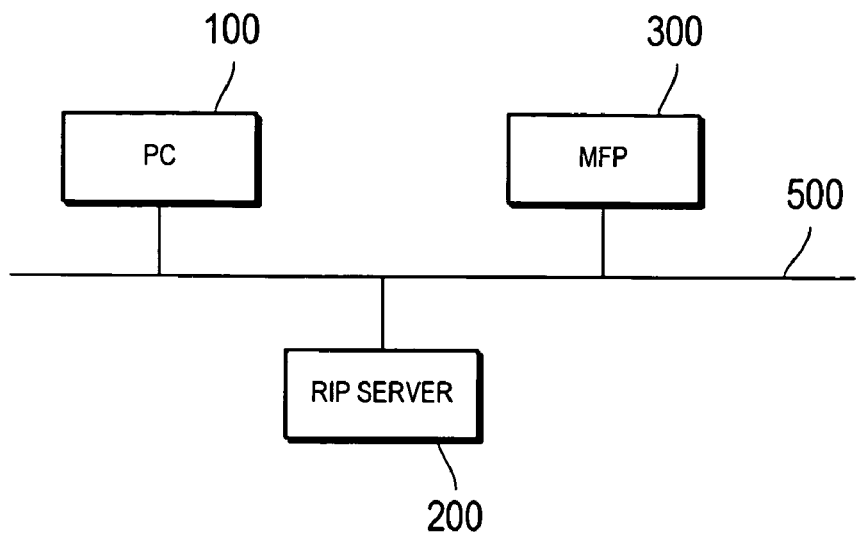
FIG. 1 is a block diagram showing the overall constitution of a printing system according to an embodiment of the present invention.

FIG. 1 is a block diagram showing the overall constitution of a printing system according to an embodiment of the present invention.

The printing system has a PC (personal computer) 100, a RIP server 200 that serves as a printing control device, and an MFP 300 that serves as a printing device, which are interconnected via a network 500 communicably with each other. The network 500 can be a LAN connecting computers and network equipment according to standards such as Ethernet®, Token Ring, and FDDI, or a WAN that consists of several LANs connected by a dedicated line.

The RIP server 200 and the MFP 300 can be directly connected between them. Moreover, the types and the number of equipment to be connected to network 500 are not limited to those shown in FIG. 1.

The PC 100 has an application for creating and editing document files installed. The PC 100 transmits print data based on a document file instructed to be printed on the application to the RIP server 200.

The RIP server 200 converts the print data received from the PC 100 into bitmap type print data (raster data) to make it understandable by the MFP 300 and transmits it to the MFP 300. The RIP server 200 is realized by using a workstation or a PC in general.

Figure 2:
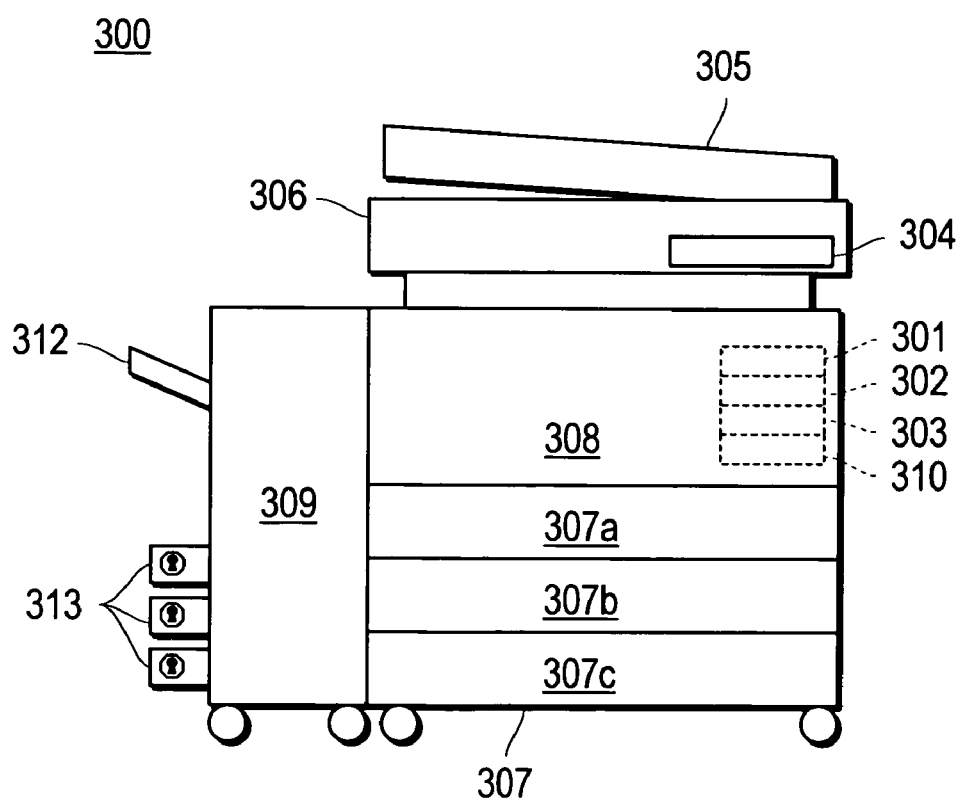
FIG. 2 is a schematic front view of an MFP.
Figure 3:
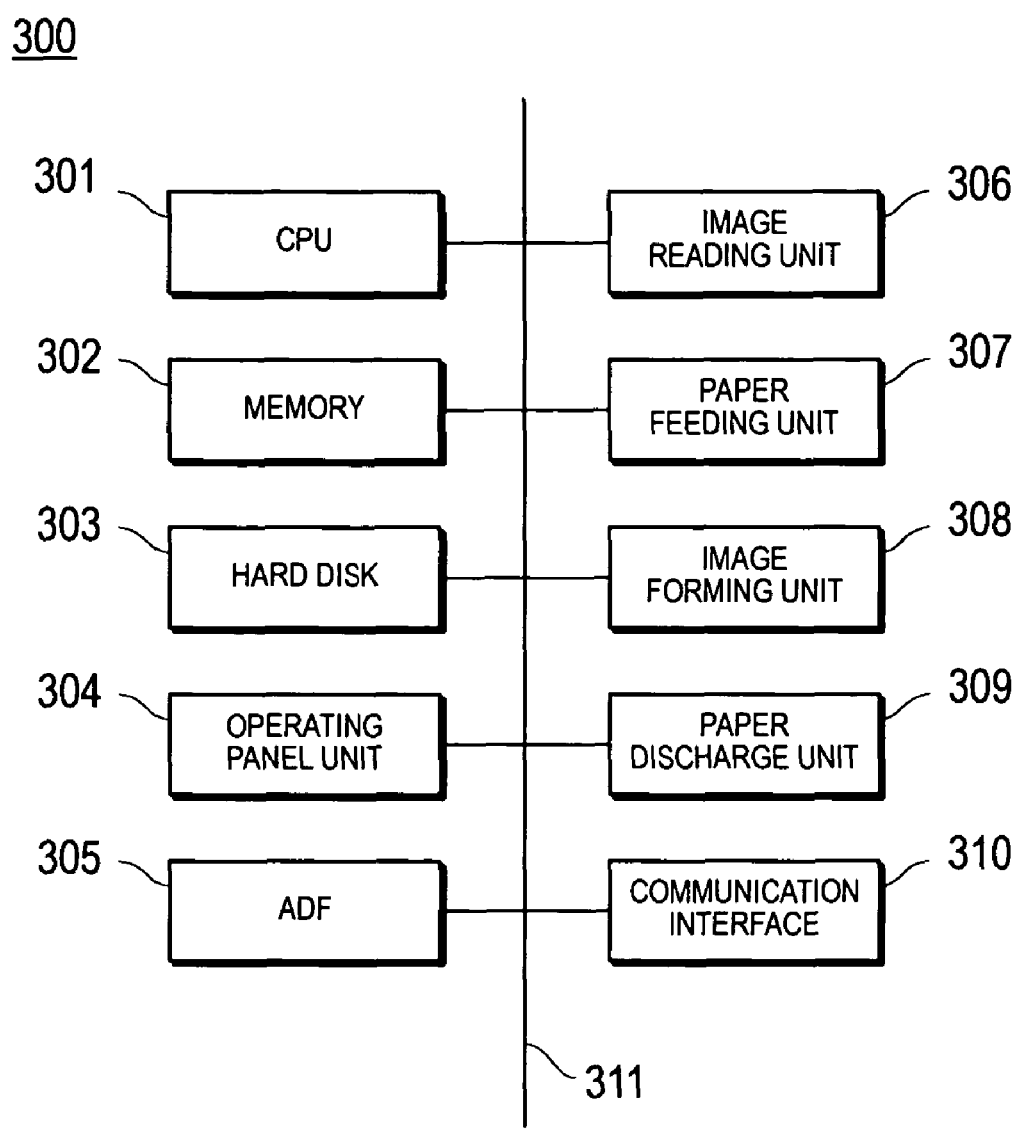
FIG. 3 is a block diagram showing the hardware constitution of the MFP.

FIG. 2 is a schematic front view of the MFP 300, and FIG. 3 is a block diagram showing the hardware constitution of the MFP 300.

The MFP 300 has a CPU 301, a memory 302, a hard disk 303, an operating panel unit 304, an ADF (Auto Document Feeder) 305, an image reading unit 306, a paper feeding unit 307, an image forming unit 308, a paper discharge unit 309, and a communication interface 310, all of which are interconnected via a bus 311 for exchanging signals.

The CPU 301 controls various parts indicated above and executes various arithmetic processes according to a program. The memory 302 stores programs and data temporarily as a working area. The hard disk 303 stores various programs including an operating system and data.

The hard disk 303 has an area for a digital output bin, which is a holding area that can hold print data and allows print data held in there to be taken out for printing when the user identification is confirmed.

The operating panel unit 304 is equipped with a touch panel, a ten-key pad, a start button, a stop button and others to be used for displaying various data and entering various instructions.

The ADF 305 transports a single or multiple sheets of paper one sheet at a time to a specified reading position of the image reading unit 306, and discharges the document sequentially after reading it.

The image reading unit 306 irradiates a document set on the specified reading position or transported to the specified reading location by the ADF 305 with a light source such as a fluorescent lamp, converts reflected lights from the document surface into electrical signals with the help of light sensitive devices such as a CCD image sensor, and generates image data from the electrical signals.

The paper feeding units 307a through 307c contain paper which is used as recording media in the printing process. The paper feeding unit 307 (integral name for 307a through 307c) feeds the contained paper to the image forming unit 308 one sheet at a time.

The image forming unit 308 prints various data on paper using a known imaging process such as the electronic photographing process which includes various steps such as electrical charging, exposure, developing, transferring and fixing steps.

The paper discharge unit 309 discharges printed paper transported from the image forming unit 308. The paper discharge unit 309 is equipped with a normal output bin 312 and a lockable output bin 313. The normal output bin 312 is a bin to which paper printed with print data in normal printing, or paper printed with print data which has been held in a digital output bin when the user identification is confirmed in confidential printing can be discharged. The lockable output bin 313 is a bin which can be locked or unlocked by a key and to which print data can be outputted in a printed form in confidential printing. The key can be either a physical key or an electronic key. Incidentally, although three lockable output bins 313 are shown in FIG. 2, the number of lockable bins 313 can be any arbitrary number.

The communication interface 310 is typically a LAN card and is used for communicating with external equipment via a network 500.

The MFP 300 can include components other than those components mentioned above, or can lack some of the components mentioned above.

The operation of the MFP 300 in this embodiment will be described in the following.

Figure 4:
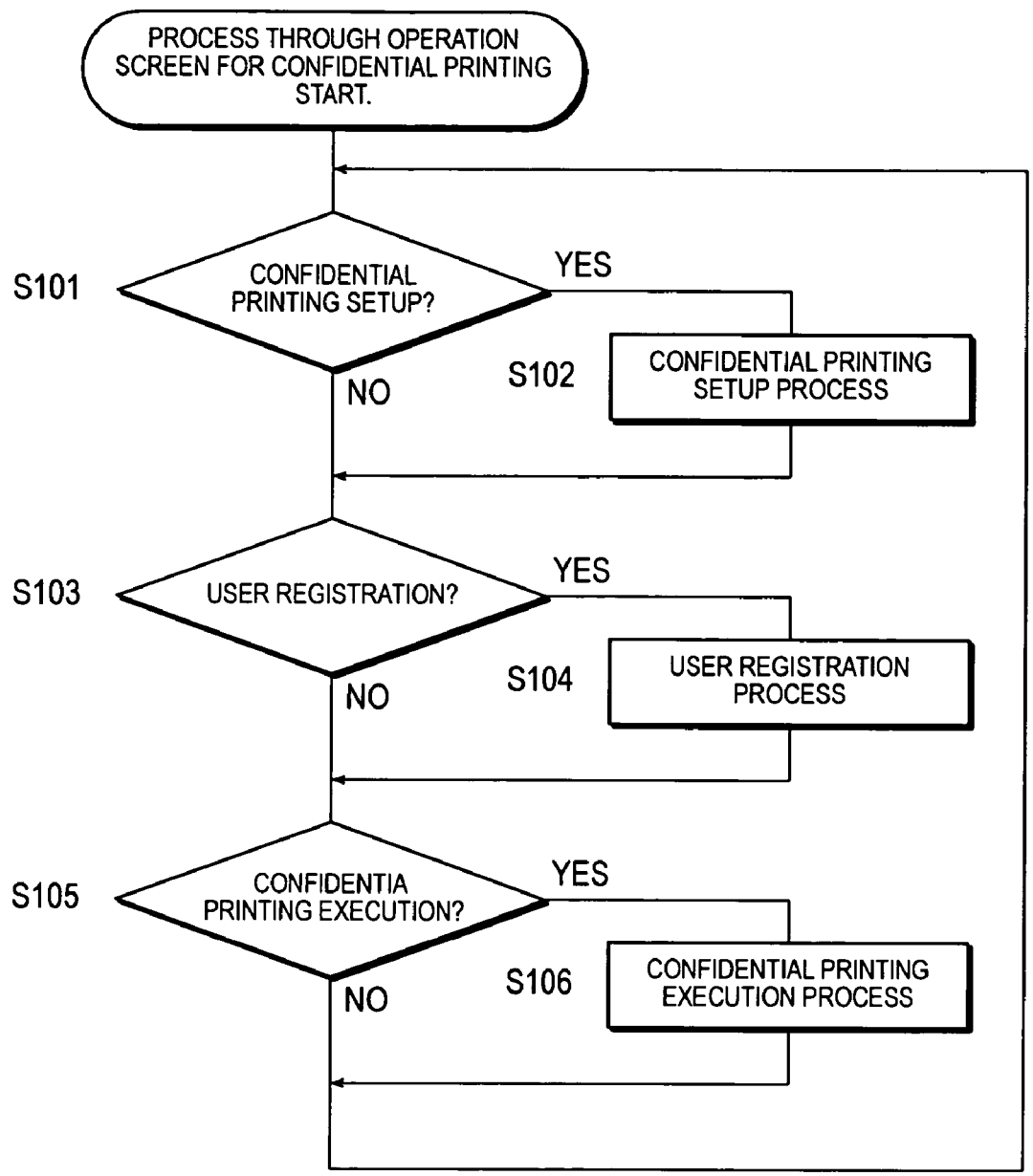
FIG. 4 is a flowchart showing the sequence of the process through an operating screen for confidential printing on the MFP.

FIG. 4 is a flowchart showing the sequence of the process through an operating screen for confidential printing on the MFP 300. The algorithm shown in the flowchart of FIG. 4 is stored as a program in the hard disk 303 of the MFP 300 and executed by CPU 301.

First, the MFP 300 makes a judgment whether "confidential printing setup" is selected on the operating screen for confidential printing displayed on the operating panel unit 304 by the user's operation or not (S101). If the "confidential printing setup" is not selected (S101: No), the program advances to the step S103.

If the "confidential printing setup" is selected (S101: Yes), the confidential printing setup screen is displayed on the operating panel unit 304 and the confidential printing setup is processed using the confidential printing setup screen (S102).

Figure 5:
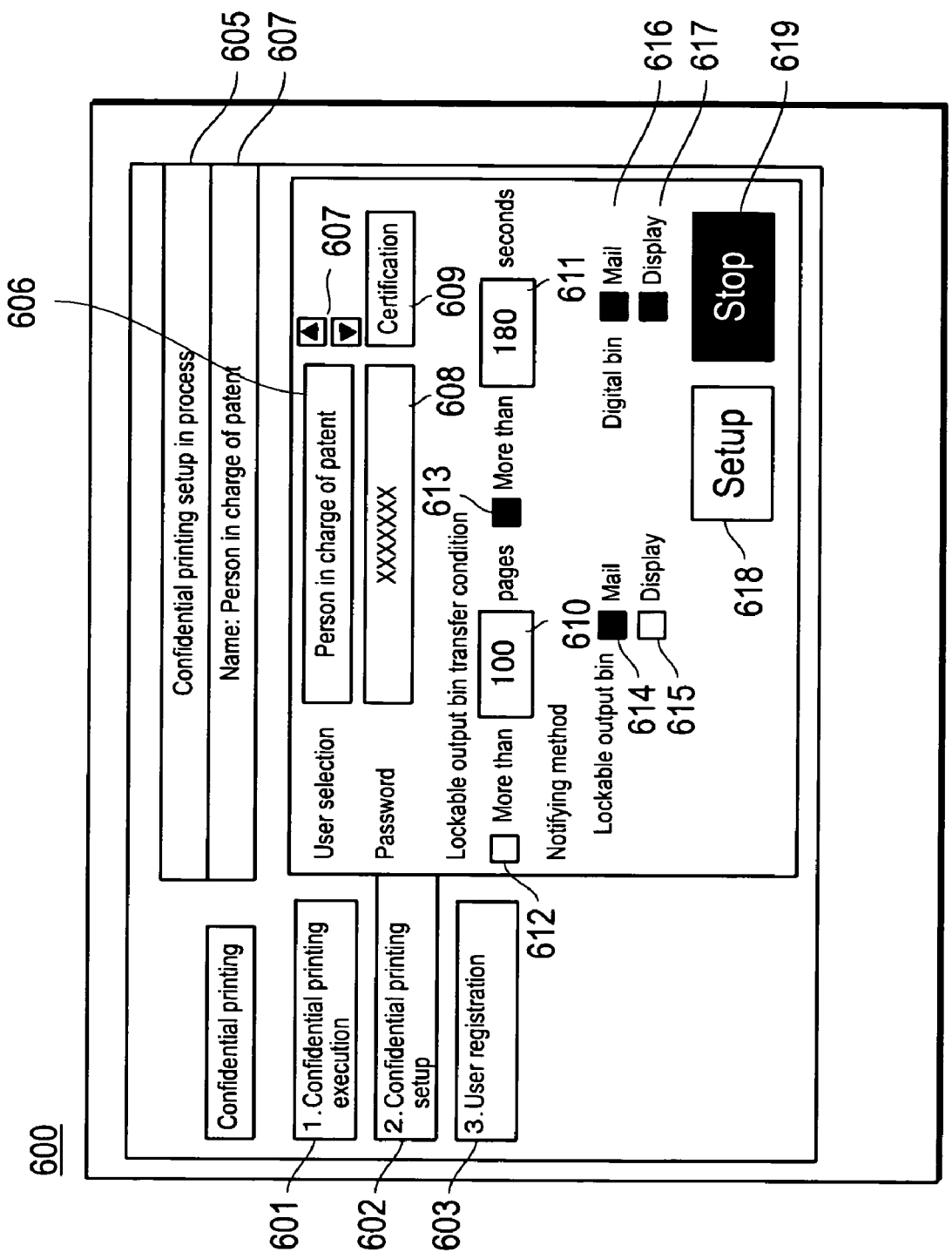
FIG. 5 shows an example of a confidential printing setup screen.

FIG. 5 shows an example of a confidential printing setup screen. The confidential printing setup screen 600 has operation switching buttons 601, 602, and 603 to switch its operation status between "confidential printing execution," "confidential printing setup," and "user registration." The confidential printing setup screen 600 also has a status display unit 604 to show the current operation status and a user display unit 605 to show the name of the user for whom the setup work is being done. The user is set up by being selected in the user selection unit 606. The user is selected here using the up and down scroll 607. After the user is selected, a password is entered into an input box 608. When a verification button 609 is pressed, the verification operation starts and a specific confidential printing setup is allowed once the verification is completed.

Setup items include information concerning the print data to be used as a judgment criterion for determining the output destination whether a lockable bin or a digital output bin to be used. More specifically, the setup items concerning the judgment criterion for determining the output destination include an input box 610 for entering a lower limit of printing number of sheets (threshold value Pa) based on the print data to decide that the output destination should be a lockable output bin and an input box 611 for entering a lower limit of expected time (threshold value Ta) needed for printing the print data to decide that the output destination should be a lockable output bin. Moreover, check boxes 612 and 613 are provided for selecting based on the print data either the number of sheets to be printed or the estimated time required for printing the print data as the judgment criterion for determining the output destination.

It is also possible to select either the method of notifying by e-mail by checking the checkbox 614 or the method of notifying by means of the operating panel unit 304 of the MFP 300 by checking the checkbox 615 as a method of notifying the user that a lockable output bin was chosen as the output destination and that the print data was printed and outputted to the lockable output bin. Similarly, it is possible to select either the method of notifying by e-mail by checking the checkbox 616 or the method of notifying by means of the operating panel unit 304 of the MFP 300 by checking the checkbox 617 as a method of notifying the user that a digital output bin was chosen as the output destination and that the print data held in the digital output bin was printed and outputted to the normal output bin.

A setup button 618 is selected by the user when the setup process of confidential printing is completed, and an abortion button 619 is selected by the user when the setup process of confidential printing is aborted.

Next, the MFP 300 makes a judgment whether "user registration" is selected on the operating screen for confidential printing displayed on the operating panel unit 304 by the user's operation or not (S103). If the "user registration" is not selected (S103: No), the program advances to the step S105.

If the "user registration" is selected (S103: Yes), the user registration screen is displayed on the operating panel unit 304 and the user registration is processed using the user registration screen (S104).

Figure 6:
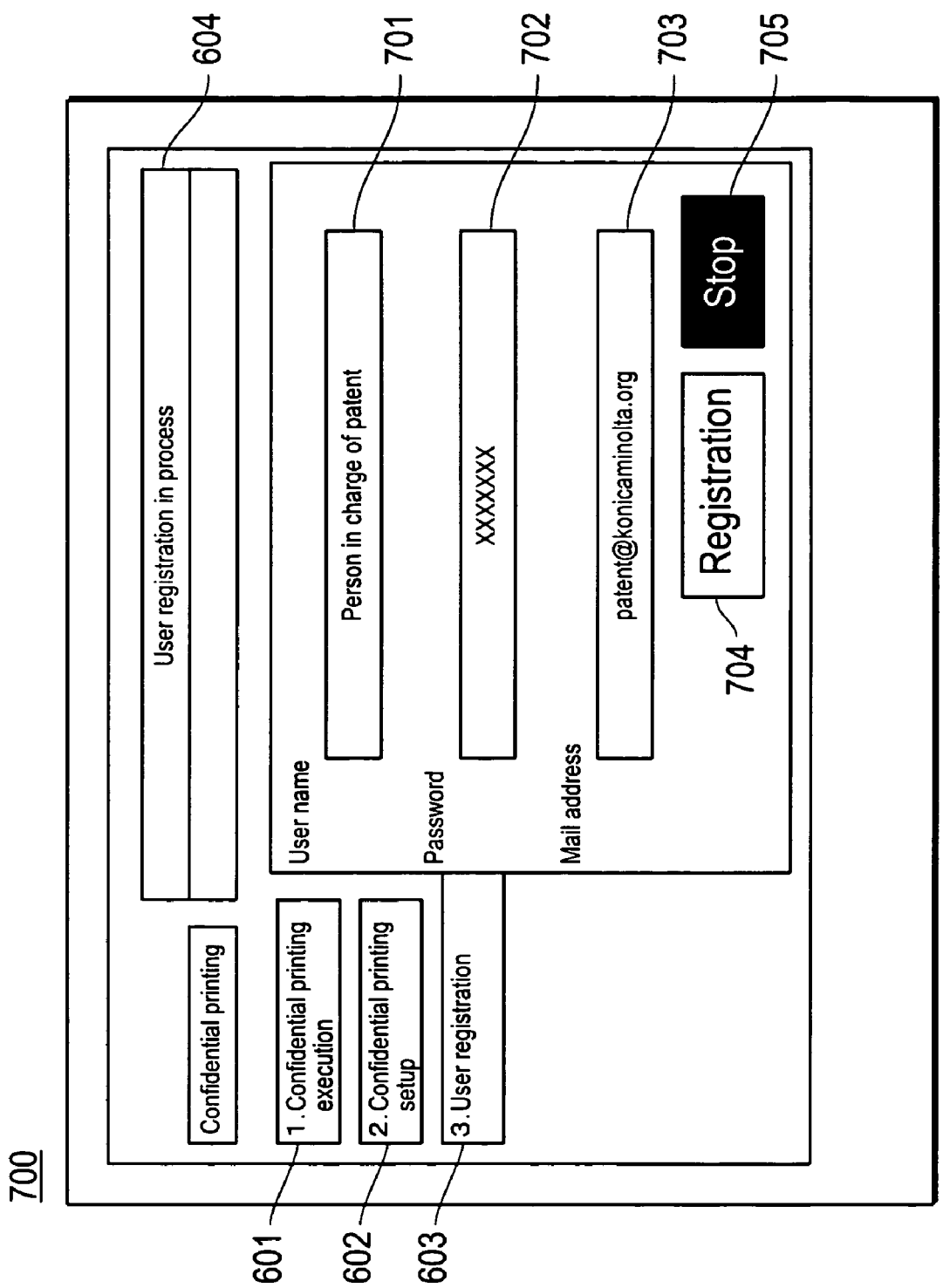
FIG. 6 shows an example of a user registration screen.

FIG. 6 shows an example of a user registration screen. The user registration screen 700 has the operation switching buttons 601, 602, and 603 as well as the status display part 604 as the confidential printing setup screen 600.

The user registration screen 700 also has input boxes 701, 702, and 703 for entering user name, password, and e-mail address. A registration button 704 is selected by the user when the input process is completed, and an abortion button 705 is selected by the user when the user registration process is aborted.

The user registration operation can be further limited by requiring the verification procedure before displaying the user registration screen 700. The e-mail address is an address for notifying the user concerning print data's output destination or printing completion and the entry of this e-mail address is not mandatory.

Next, the MFP 300 makes a judgment whether "confidential printing execution" is selected on the operating screen for confidential printing displayed on the operating panel unit 304 by the user's operation or not (S105). If the "confidential printing execution" is not selected (S105: No), the program advances to the step S101.

If the "confidential printing execution" is selected (S105: Yes), the confidential printing execution screen is displayed on the operating panel unit 304 and the confidential printing execution is processed using the confidential printing execution screen (S106).

Figure 7:
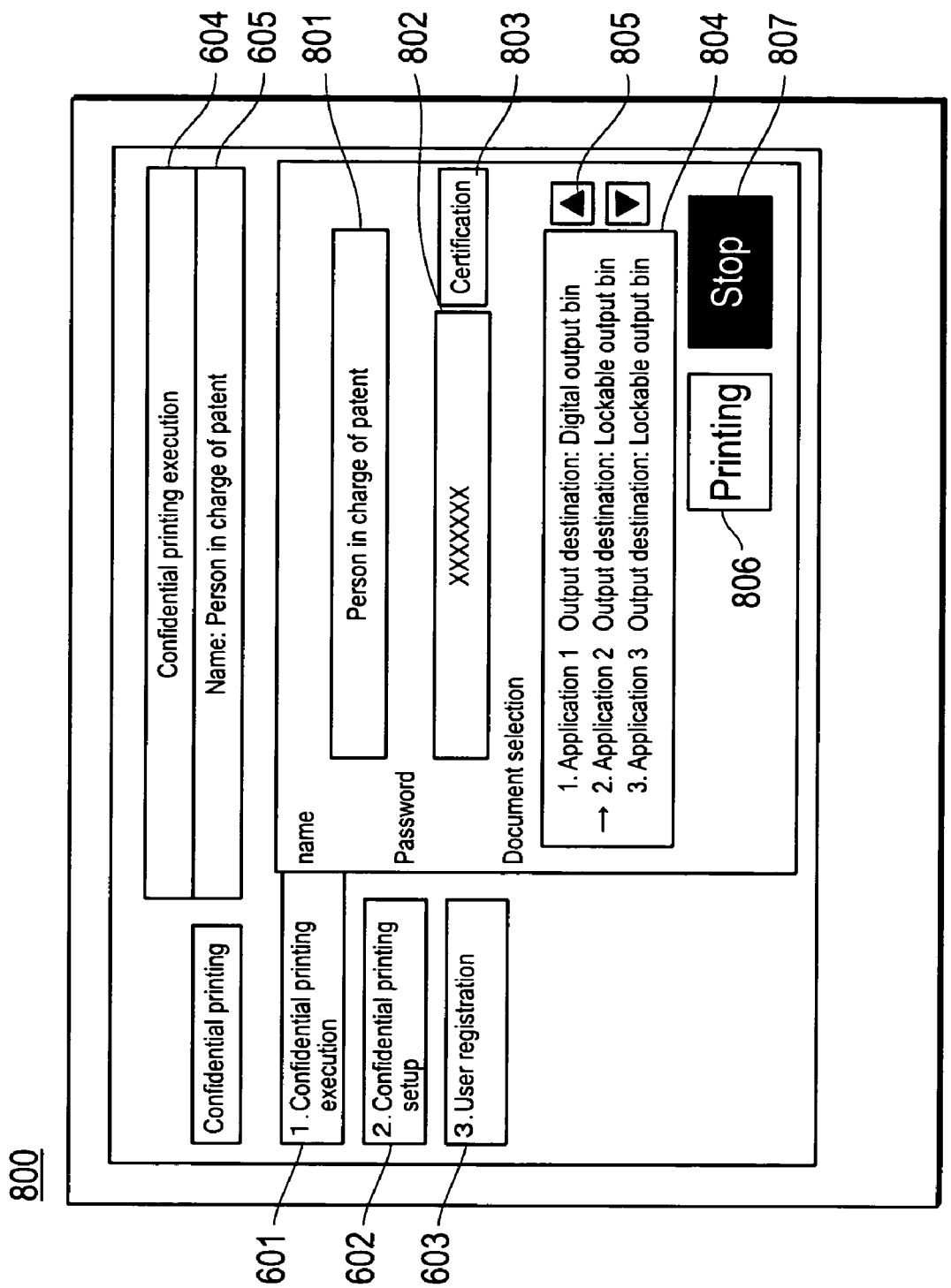
FIG. 7 shows an example of a confidential printing execution screen.

FIG. 7 shows an example of a confidential printing execution screen. The confidential printing execution screen 800 has the operation switching buttons 601, 602, and 603 as well as the status display part 604 and the user display part 605 as the confidential printing setup screen 600.

In the confidential printing execution screen 800, the user name is entered into the input box 801 and the password is entered into the input box 802. When a verification button 803 is pressed, the verification operation starts and the selection of a document file to be confidentially printed is allowed once the verification is completed. The document selection part 804 displays the document file that corresponds to the print data held for the particular user. An output destination is displayed on the side of the document file name. The print data held in the digital output bin is printed out after it is selected by a selection key 805 and a printing button 806 is pressed. If it is desired to abort the printing output, an abortion button 807 is to be selected by the user.

Figure 8:
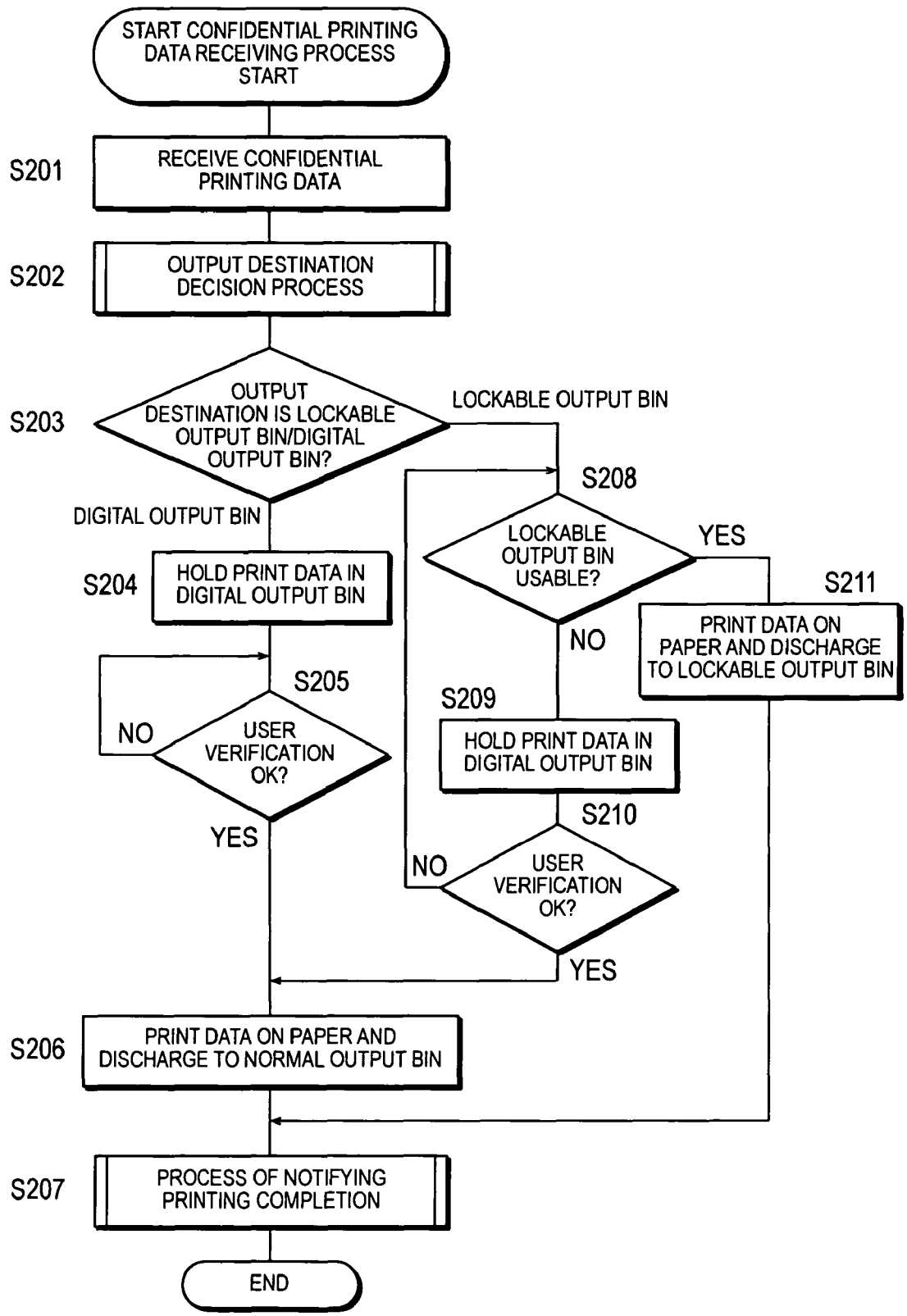
FIG. 8 is a flowchart showing the sequence of the process for receiving confidential print data on the MFP.
Figure 9:
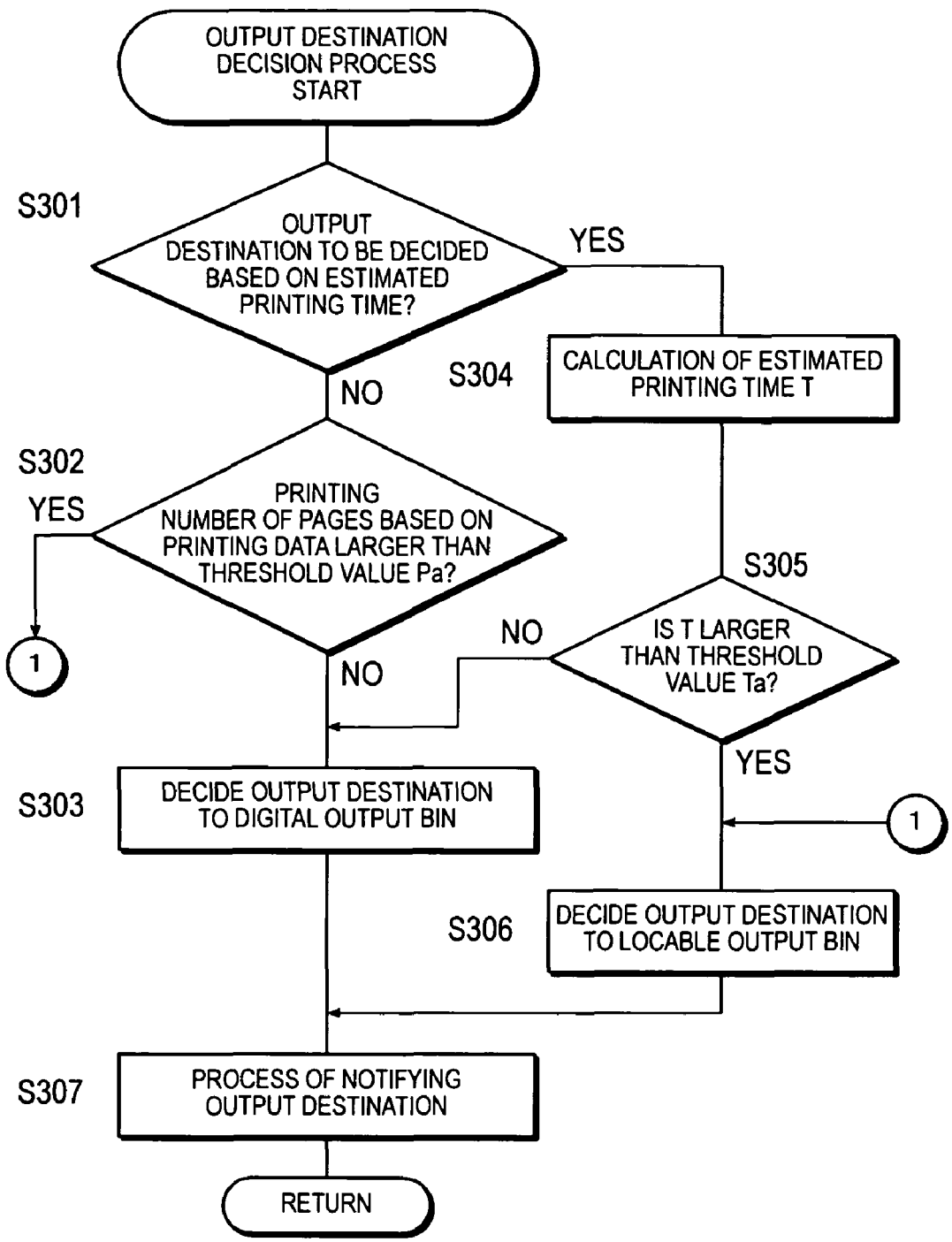
FIG. 9 is a flowchart showing the sequence of the process for deciding an output destination.
Figure 10:
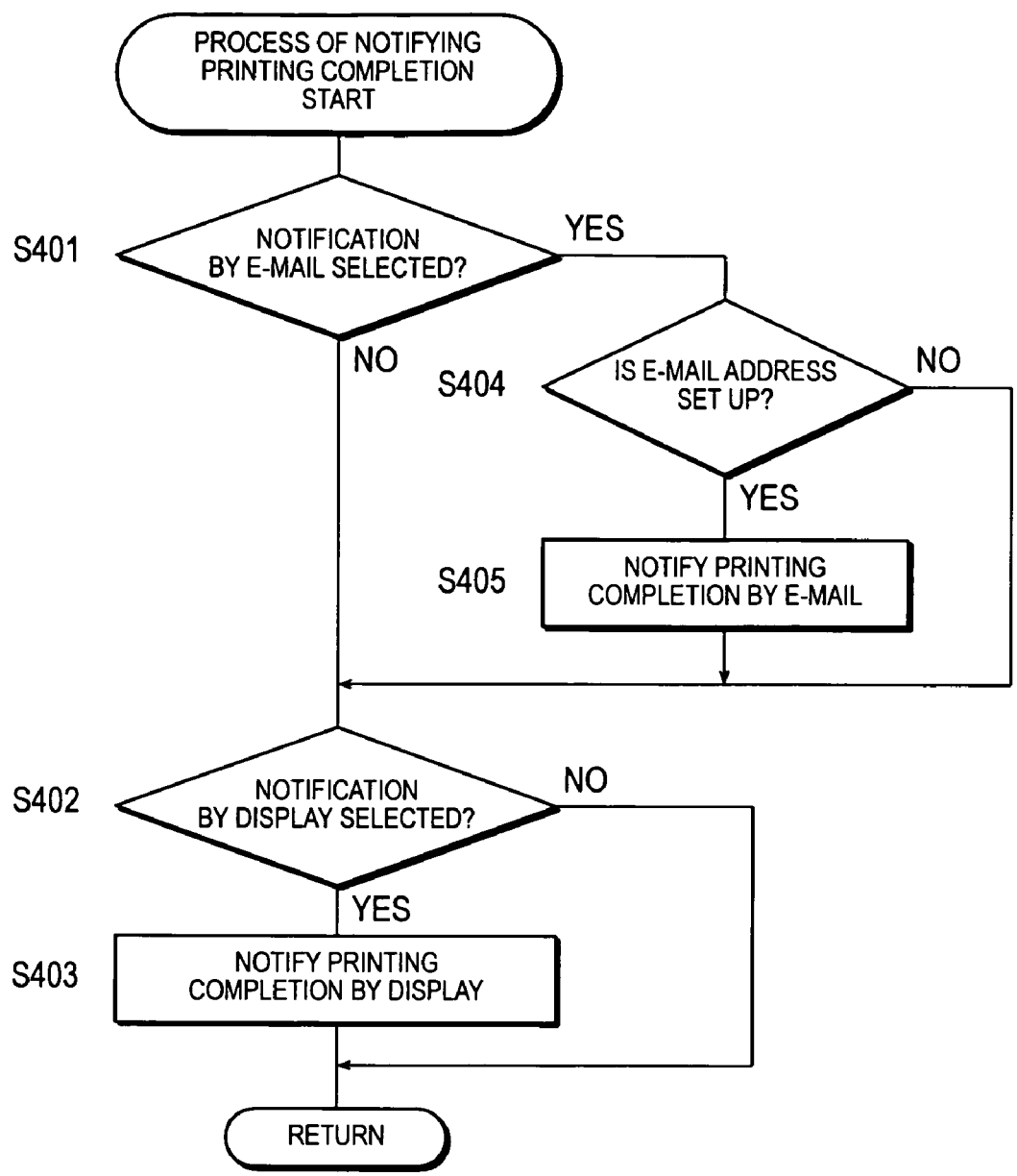
FIG. 10 is a flowchart showing the sequence of the process for notifying printing completion.

FIG. 8 through FIG. 10 show flowcharts showing the sequence of the process for receiving confidential print data on the MFP 300. The algorithm shown in the flowcharts of FIG. 8 through FIG. 10 is stored as a program in the hard disk 303 of the MFP 300 and executed by the CPU 301.

First, the MFP 300 receives the print data for confidential printing from the PC 100 via the RIP server 200 (S201).

Next, a decision process is executed for deciding the destination of the received print data should be the lockable output bin 313 or the digital output bin (S202). The detail of the decision process concerning the output destination will be described later.

In the step S203, a judgment is made as to whether the output destination decided in the step S202 is the lockable output bin 313 or the digital output bin.

If the output destination decided is a digital output bin (S203: digital output bin), the print data received in the step S201 is held in the digital output bin (S204). The MFP 300 stands by until the user verification is completed in the confidential printing execution process using the execution screen 800 of the confidential printing (S205: No). When the user verification is completed (S205: yes) the print data held in the digital output bin is printed on paper by the image forming unit 308, and discharged to the normal output bin 312 by the paper discharge unit 309 (S206).

On the other hand, if the decided output destination is the lockable output bin (S203: lockable output bin), a judgment is made as to whether the lockable output bin 313 is in a usable condition or not including a determination whether it is empty or not (S208). If the lockable output bin 313 is in a usable condition (S208: Yes), the print data received in the step S201 will be printed on paper by the image forming unit 308 and discharged to the lockable output bin 313 by the paper discharge unit 309 (S211). If the lockable output bin 313 is in an unusable condition (S208: No), the print data received in the step S201 is held in the digital output bin (S209). If the user verification is completed in the confidential printing execution process using the confidential printing execution screen 800 (S210: Yes), the program advances to the step S206. When the lockable output bin 313 becomes useable (S208: Yes) before the user verification is completed (S210: No), the program advances to the step S211.

In the step S207, the notification process will be done to notify the user that the printing is completed. The detail of the notification process notifying the printing completion will be described later.

Next, the process of deciding the output destination in the step S202 will be described below with reference to FIG. 9.

First, the MFP 300 makes a judgment as to whether estimated printing time is selected or not as a judgment criterion for determining the output destination of print data in the confidential printing setup process using the confidential printing setup screen 600, i.e., whether the output destination is going to be determined based on the estimated printing time or not (S301).

If the estimated printing time is not selected as a judgment criterion for determining the output destination of the print data (S301: No), it is assumed that the number of pages to be printed based on the print data is selected as the judgment criterion for determining the output destination of the print data, and a judgment is made as to whether the number of pages to be printed based on the print data is larger than a predetermined threshold value Pa or not (S302).

If it is determined that the number of pages to be printed is larger than the threshold value Pa in the step S302 (S302: Yes), the program advances to the step S306, while it advances to the step S303 if the number of printed pages is smaller than the threshold value Pa (S302: No).

In the step S303, the output destination of the print data is determined to be a digital output bin. On the other hand, in the step S306, the output destination of the print data is determined to be the lockable output bin 313.

If it is judged in the step S301 that the judgment criterion for determining the output destination of the print data is the estimated printing time (S301: Yes), the estimated time T required for printing the received print data is calculated (S304).

For example, the estimated printing time T can be calculated from the following equation, where $T_0$ is the estimated printing time per page for a particular printing mode, N is the number of pages to be printed, and K is the confidentiality coefficient:

$$T=T_0*N*K$$

The estimated printing time per page for a particular printing mode, $T_0$, is preset as shown in FIG. 11 depending on printing modes of color/monochromatic and single/double side, as well as to the size of the paper and the orientation of printing, and saved on the hard disk 303 of the MFP 300.

The confidentiality coefficient K is a coefficient that depends on the importance of confidentiality of the print data. The confidentiality coefficient K is set up relative to the print data on the PC 100 that transmits the print data. For example, if security information such as watermarks of "Important," "Confidential," and "Internal Use Only" is set up on the print data, the document is considered to be of high importance.

The higher the importance is, the smaller the confidentiality coefficient K is set in this case. For example, if a watermark such as "Important" is set up, the confidentiality coefficient K is set up as 0.8 while the confidentiality coefficient K is set at 1.0 in other cases. This is due to a security policy that it is preferable for the user to come to the place where the MFP 300 is installed and printing does not start until after user verification is completed if the particular print data has a high degree of importance even if the number of pages to be printed is high. On the other hand, a security policy can be such that print data with a high importance should preferably be printed out to a lockable output bin rather than being held in a digital output bin regardless of the number of pages to be printed. The higher the importance is, the larger the confidentiality coefficient K is set in this case.

As can be seen from the above, the estimated printing time is modified in accordance with the importance of the confidentiality of the print data in this embodiment, but it is not necessarily to be modified. Also, the number of pages to be printed based on the print data which is used as the judgment criterion for determining the output destination of the print data as described before can be modified based on the importance of the confidentiality of the print data.

In the step S305, a judgment is made as to whether the calculated printing time estimate T is larger or not than the predetermined threshold value Ta.

If it is determined that the estimated printing time T is larger than the threshold value Ta in the step S305 (S305: Yes), the program advances to the step S306, while it advances to the step S303 if it is smaller than the threshold value Ta (S305: No).

In the step S307, the notification process will be done to notify the user about the determined output destination of the print data. Here the user will be notified according to the notification method preset in the confidential printing setup process using the confidential printing setup screen 600 that the digital output bin or the lockable output bin 313 is selected as the output destination in accordance with the decision made in the step S303 or S306. The process in the step S307 is conducted generally similar to the process in the step S207, which will be described below.

Next, the process of notifying the printing completion in the step S207 will be described below with reference to FIG. 10.

First, the MFP 300 makes a judgment whether the e-mail notification method is selected in the confidential printing setup process using the confidential printing setup screen 600 or not (S401). A notification method selected in accordance with the output destination is referenced here (ditto in the following).

If the e-mail notification method is not selected (S401: No), a judgment is made as to whether the method of notifying the user by means of displaying a notice on the operating panel unit 304 is selected or not (S402). If the method of notifying the user by displaying a notice on the operating panel unit 304 is not selected (S402: No), the program returns to the flowchart of FIG. 8.

If the method of notifying the user by displaying a notice on the operating panel unit 304 is selected (S402: Yes), it is displayed on the operating panel unit 304 that the printed paper is outputted to the lockable output bin or the normal output bin (S403).

On the other hand, if it is judged that the e-mail notification method is selected in the step S401 (S401: Yes), a judgment is made as to whether the corresponding user's e-mail address is set up or not in the user registration process using the user registration screen 700 (S404).

If the corresponding user's e-mail address is set up (S404: No), the notification that the printed paper is outputted to the lockable output bin or the normal output bin is sent to the specified e-mail address (S405), after which the program advances to the step S402. If no e-mail address is specified for the corresponding user (S404: No), the program advances to the step S402.

As can be seen from the above, the MFP 300 of the present embodiment receives print data for confidential printing, and decides the output destination of the print data received for confidential printing either to be a lockable output bin that can be opened by a key so that the print data can be outputted in a format of being printed on paper, or a digital output bin that is capable of holding the print data and allowing the print data held there to be taken out for printing based on user verification. In other words, the present embodiment allows the print data to be outputted in two selectable output formats for the purpose of confidential printing. This makes it possible to select a suitable output format after securing the confidentiality.

Therefore, the MFP 300 allows the user to select the print data to be printed and outputted to a lockable output bin if a large number of pages is to be printed, thus requiring a long time to print. In such a case, the user can go to the place where the MFP 300 is located in a proper timing for printing completion to obtain the printed matter using a key without having to wait at the MFP 300. On the other hand, if the number of pages to be printed is small, i.e., when the printing time is expected to be short, the MFP 300 can output the print data to a digital output bin, from which the output can be obtained in exchange with the user verification. In such a case, the user can go to the place where the MFP 300 is located and get the printed matter quickly after the user verification is finished.

Thus, the present embodiment enables the user not to wait a long time in front of the MFP 300 contrary to the user's will, while preventing information leakage due to printed matter at the same time.

It is obvious that this invention is not limited to the particular embodiments shown and described above but may be variously changed and modified without departing from the technical concept of this invention.

For example, although an MFP is mentioned as the printing device in the above embodiment, the invention is not limited to it and other printing devices such as a copying machine and a printer can be used in this invention.

Although the digital output bin is provided in the hard disk 303 of the MFP 300 in the above embodiment, the invention is not limited to it. The digital output bin can be provided in the RIP server 200, or can be provided on other equipment on the network 500 that can communicate with the MFP 300.

Although the process shown in FIG. 8 is executed by the MFP 300 in the above embodiment, the invention is not limited to it. For example, a portion of the process shown in FIG. 8 such as the output destination decision process (S202) can be executed by the RIP server 200.

Although the output destination of the print data is automatically determined by the MFP 300 in correspondence with the information concerning the print data in the above embodiment, the invention is not limited to it. The print data output destination can be specified by the user on the PC 100 which is used to transmit the print data.

The means and method of conducting various processes in the printing system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a storage unit such as a hard disk. Said program can also be provided as independent application software or can be built into the software of the device as a part of its function.

What is claimed is:

1. A method of printing using a printing device, the method comprising the steps of:
   1) receiving print data for confidential printing;
   2) deciding between (a) printing the received print data by the printing device and outputting the printed data to a lockable output bin that can be opened by a key, or (b) outputting the received print data to a storage memory holding unit that is capable of holding the print data and allowing the print data held there to be taken out for printing based on user verification;
   wherein said print data's output destination is decided in accordance with information concerning the print data in said step 2); and
   wherein said information concerning the print data is an estimated time required for printing said print data calculated based on said print data's printing condition, and said print data's output destination is decided in said step 2) to be said lockable output bin if said estimated time is larger than a predetermined threshold value, and to said holding unit if said estimated time is smaller than the threshold value.

2. A method of printing using a printing device, the method comprising the steps of:
   1) receiving print data for confidential printing;
   2) deciding between (a) printing the received print data by the printing device and outputting the printed data to a lockable output bin that can be opened by a key, or (b) outputting the received print data to a storage memory holding unit that is capable of holding the print data and allowing the print data held there to be taken out for printing based on user verification;
   wherein said print data's output destination is decided in accordance with information concerning the print data in said step 2); and
   wherein said information concerning the print data is a number of pages to be printed based on the print data, and said print data's output destination is decided in said step 2) to be said lockable output bin if said number of pages to be printed is larger than a predetermined threshold value, and to said holding unit if said number of pages to be printed is smaller than the threshold value.

3. The method as claimed in claim 1, wherein said print data's output destination is decided in accordance with information concerning the print data, which is modified based on degree of importance of confidentiality of the print data in said step 2).

4. The method as claimed in claim 1, wherein said print data's output destination is decided to said holding unit regardless of contents of information concerning the print data if said lockable output bin is in an unusable condition in said step 2).

5. The method as claimed in claim 1, wherein said holding unit is provided in a printing device used for printing the print data.

6. The method as claimed in claim 1, wherein said holding unit is provided in a printing control device that converts the print data into bitmap format data and transferees the data to a printing device.

7. The method as claimed in claim 1, wherein said holding unit is provided in equipment located on a network through which it can communicate with a printing device for printing the print data.

8. The method as claimed in claim 1, further comprising the steps of: 3) notifying a user of the decided print data's output destination.

9. The method as claimed in claim 1, further comprising the steps of: 4) notifying a user of completion of printing the print data.

10. A printing device, comprising:
    a receiving unit for receiving print data for confidential printing;
    a controller for deciding between (a) printing the received print data and outputting the printed data to a lockable output bin that can be opened by a key, or (b) outputting the received print data to a holding unit that is capable of holding the print data and allowing the print data held there to be taken out for printing based on user verification;
    wherein said controller decides said print data's output destination in accordance with information concerning the print data;
    wherein said information concerning the print data is an estimated time required for printing said print data calculated based on said print data's printing condition, and said controller decides said print data's output destination to be said lockable output bin if said estimated time is larger than a predetermined threshold value, and to said holding unit if said estimated time is smaller than the threshold value.

11. A printing device, comprising:
    a receiving unit for receiving print data for confidential printing;
    a controller for deciding between (a) printing the received print data and outputting the printed data to a lockable output bin that can be opened by a key, or (b) outputting the received print data to a holding unit that is capable of holding the print data and allowing the print data held there to be taken out for printing based on user verification;
    wherein said controller decides said print data's output destination in accordance with information concerning the print data;
    wherein said information concerning said print data is a number of pages to be printed based on the print data, and said controller decides said print data's output destination to be said lockable output bin if said number of pages to be printed is larger than a predetermined threshold value, and to said holding unit if said number of pages to be printed is smaller than the threshold value.

12. The printing device as claimed in claim 10, wherein said controller decides said print data's output destination in accordance with information concerning the print data, which is modified based on degree of importance of confidentiality of the print data.

13. The printing device as claimed in claim 10, wherein said controller decides said print data's output destination to said holding unit regardless of contents of information concerning the print data if said lockable output bin is in an unusable condition.

14. The A printing device as claimed in claim 10, wherein said holding unit is provided in the printing device.

15. The printing device as claimed in claim 10, wherein said holding unit is provided in a printing control device that converts the print data into bitmap format data and transferees the data to the printing device.

16. The printing device as claimed in claim 10, wherein said holding unit is provide in equipment located on a net work through which it can communicate with the printing device.

17. The printing device as claimed in claim 10, wherein said controller further notifies the decided print data's output destination.

18. The printing device as claimed in claim 10, wherein said controller further notifies completion of printing the print data.

* * * * *